United States Patent
Höglauer (10) Patent No.: US 12,042,958 B2
(45) Date of Patent: Jul. 23, 2024

(54) TREATMENT MACHINE FOR A FLEXIBLE MATERIAL WEB, IN PARTICULAR A PLASTICS FILM, WHICH CAN BE PASSED THROUGH A TREATMENT FURNACE

(71) Applicant: BRÜCKNER MASCHINENBAU GmbH, Siegsdorf (DE)

(72) Inventor: Christoph Höglauer, Waging am See (DE)

(73) Assignee: BRÜCKNER MASCHINENBAU GmbH, Siegsdorf (DE)

( * ) Notice: Subject to any disclaimer, the term of this patent is extended or adjusted under 35 U.S.C. 154(b) by 71 days.

(21) Appl. No.: 17/530,660

(22) Filed: Nov. 19, 2021

(65) Prior Publication Data
US 2022/0152884 A1    May 19, 2022

(30) Foreign Application Priority Data
Nov. 19, 2020    (DE) .................... 10 2020 130 631.8

(51) Int. Cl.
*B29C 35/06*    (2006.01)
*B05B 13/02*    (2006.01)
(Continued)

(52) U.S. Cl.
CPC .......... *B29C 35/06* (2013.01); *B05B 13/0278* (2013.01); *B29C 35/045* (2013.01);
(Continued)

(58) Field of Classification Search
None
See application file for complete search history.

(56) References Cited

U.S. PATENT DOCUMENTS 3,181,250 A    5/1965  Vits
10,184,722 B1 *  1/2019  Ingle .................. F26B 3/283
(Continued)

FOREIGN PATENT DOCUMENTS

DE    92 13 802.0    12/1992
DE    10 2018 124 521    4/2020
(Continued)

OTHER PUBLICATIONS

India Examination Report with English translation for Application No. 202124052823, six pages, dated May 26, 2022.
(Continued)

*Primary Examiner* — Jacob T Minskey
*Assistant Examiner* — Adrien J Bernard
(74) *Attorney, Agent, or Firm* — Nixon & Vanderhye P.C.

(57) ABSTRACT

A treatment machine for flexible material webs which can be passed through treatment furnaces is disclosed having at least two successive zones in an extraction direction (A) of the material web, a zone separation device in relation to the extraction direction (A) of the flexible material web. The zone separating device includes at least one air partitioning device (AC) having an injection device (AC-E) which extends transversely to the material web and is designed such that a gaseous fluid flow (S) extending up to the flexible material web is generated above it. The injection device (AC-E) is also designed such that the gaseous fluid flow exiting from the injection device (AC-E) impinges obliquely in the direction of the flexible material web and thus on the material web plane (E) formed by the material web at a blowing angle (α).

14 Claims, 8 Drawing Sheets

(51) Int. Cl.
   *B29C 35/04*   (2006.01)
   *B29C 55/16*   (2006.01)
   *F27B 9/02*    (2006.01)
   *F27B 9/28*    (2006.01)
   *B29L 7/00*    (2006.01)

(52) U.S. Cl.
   CPC ............ *B29C 55/165* (2013.01); *F27B 9/028* (2013.01); *F27B 9/28* (2013.01); *B29L 2007/008* (2013.01)

(56) References Cited

U.S. PATENT DOCUMENTS

| | | | |
|---|---|---|---|
| 2017/0114483 A1* | 4/2017 | Boscolo | D04H 1/56 |
| 2018/0311866 A1* | 11/2018 | Nishikawa | B29C 35/045 |
| 2021/0207256 A1* | 7/2021 | Hanson | B05B 12/10 |

FOREIGN PATENT DOCUMENTS

| | | |
|---|---|---|
| EP | 1 616 690 | 1/2006 |
| EP | 3 632 640 | 4/2020 |
| WO | 2012/067573 | 5/2012 |

OTHER PUBLICATIONS

European Search Report for EP 21 20 7178, one page, dated Apr. 14, 2022.

* cited by examiner

TREATMENT MACHINE FOR A FLEXIBLE MATERIAL WEB, IN PARTICULAR A PLASTICS FILM, WHICH CAN BE PASSED THROUGH A TREATMENT FURNACE

CROSS RELATED APPLICATION

This application claims priority to German Patent Application DE 10 2020 130 631.8, filed Nov. 19, 2020, the entire contents of which is hereby incorporated by reference.

The invention relates to a treatment machine for a flexible material web, in particular in the form of a plastics film, which can be passed through a treatment furnace, as specified in the preamble of claim 1.

Such treatment machines are often film-stretching machines which are used in particular in plastics film production. So-called simultaneous stretching machines are known, in which a plastics film can be stretched simultaneously in the longitudinal and transverse directions. Also known are so-called sequential stretching machines in which the plastics film is stretched in two successive stages, for example first in the longitudinal direction and then in the transverse direction (or vice versa). Finally, purely longitudinal stretching machines and purely transverse stretching machines are also known.

As is known, in the production of a plastics film, the material web to be stretched is grasped at the two opposite film edges by means of clips which are displaceably arranged on both sides of the material web to be stretched on circumferential guide rails. The clips are successively moved from an inlet zone (in which the edge of a plastics film to be stretched, for example, is grasped) via a stretching zone (in which the opposing clips on the guide rail portions are moved away from one another with a transverse component divergent to the transport direction) to an outlet zone and then on a return path back to the inlet zone, with the film of the stretching zone then usually being subjected to a certain relaxation and/or post-heat treatment downstream, for example, in one or more treatment zones (annealing zone, cooling zone).

The plastics film must be subjected before, during and after the actual stretching process to different heating and/or cooling phases in the individual portions. As a result, the plastics film web to be stretched passes through a furnace which has successively different treatment zones (and optionally also neutral zones therebetween). In these treatment zones, the plastics film to be produced is not only subjected to a different heat treatment, but, above all, a furnace air supply must be provided in order to always supply the furnace interior of the stretching machine with fresh air and to extract the polluted air.

Since such a treatment furnace is usually divided into a plurality of treatment portions in the form of treatment zones, the plastics film, i.e. the flexible material web in general, exits from one zone and enters a next zone in which a treatment of the material web at other temperatures will in some circumstances take place.

In principle, a stretching machine is thus divided into a plurality of zones. For example, a preheating zone, a stretching zone, an annealing zone and a cooling zone may be provided. The preheating and the stretching zone can also be designed as a common zone. The cooling zones (but also in principle other zones) can also be divided into a plurality of separate zones, for example into a first and second cooling zone, which are provided in succession, and a third cooling zone at the end of the stretching machine, which e.g. is separated by a neutral zone provided between the second and the third cooling zone. Such a neutral zone can, for example, also be provided between the stretching zone and the annealing zone (and then also in other places). In general, where one zone transitions into a neutral zone and the neutral zone then transitions into a subsequent zone, an inlet gap and an outlet gap (sometimes also called an inlet slot and an outlet slot) are provided for the plastics film moving through the stretching furnace. Otherwise, the individual zones may also comprise a plurality of chambers, such as the annealing zone which may have a plurality of chambers. There are generally no inlet and outlet gaps provided for the plastics film between the individual chambers of a zone.

Against this background, there is always the problem that, for example, in the region of an outlet from a treatment zone into a neutral zone, fluid is more or less taken along with, i.e. "entrained" by, the moving film. Upon entry of the plastics film from a neutral zone into a subsequent treatment zone, (ambient) air may also be introduced into the treatment space of the subsequent treatment zone. This leakage of fluid from one treatment zone to a neutral zone as well as the introduction of ambient air (present in a neutral zone) into a subsequent treatment zone is ultimately caused by the plastics film moving through the stretching furnace, thereby physically entraining adjacent fluid or adjacent air layers.

As a rule, the fluid entrained from a treatment zone is at a treatment temperature that is not optimal for the subsequent treatment chamber because the correspondingly entrained fluid is either too hot or too cool and thus changes the set temperature of the treatment chamber in the subsequent zone in an undesirable manner. This fluid transport can also transport contaminated fluid into the adjacent zone, which then possibly leads to undesirable effects in the adjacent zone, e.g. to condensation of the undesired fluid components.

In addition to the fluid entrained by the film movement, an additional overlapping basic flow is caused by the different pressure levels in the overall furnace, which basic flow also reinforces the fluid exchange between the treatment chambers and/or between the treatment chambers of a subsequent neutral zone or a neutral zone and a subsequent treatment chamber.

However, insufficient partitioning of two different zones may not only cause a relatively uncontrolled emerging air flow over the entire film web, but can additionally lead to relatively uncontrollable pressure conditions. In the case of very wide plastics film webs and correspondingly unsteady air pressure conditions, air induction and air extraction over the entire width of the plastics film web can take place simultaneously at the provided outlet gaps, meaning that the plastics film web could be temperature-controlled differently over its width, which can lead, for example, to flatness problems in plastics films.

In combination, therefore, a basic flow is produced due to the drag effect of the film and/or the existing pressure differences in the furnace, which basic flow can lead to zones with a "wrong temperature." For example, hot air can flow into a cold furnace zone or, conversely, cold air can flow into a hot furnace zone.

This can, in principle, lead to a poorer film quality, i.e. to poorer mechanical and/or optical properties of the film due to incorrect heating or incorrect cooling, i.e. at least due to non-optimal heating or cooling. These deteriorations occur especially when stretching the film.

Therefore, it has already been proposed to establish a thermal separation between two successive treatment chambers or treatment zones, namely in the form of so-called neutral zones. Such neutral zones can be provided anywhere between two treatment zones, for example between the stretching zone and the annealing zone or for example between the annealing zone and the cooling zone, and in some cases also before the last cooling zone.

However, it has been found that even the creation of so-called neutral zones is not sufficient because, when the material web exits a previous treatment zone, an undesirably high level of fluid is introduced into the neutral zone due to the drag effect or an undesired amount of fluid from the neutral zone is entrained into the subsequent treatment zone via the inlet slot.

Therefore, attempts have been made to produce partitioning devices to further restrict or minimise the amount of entrained gaseous medium entering and/or exiting a treatment chamber, typically a furnace.

According to DE 92 13 802 U1, a partitioning device for a stretching machine, in particular a wide stretching machine for plastics film webs, has been proposed, in which a gaseous media flow is generated substantially tangentially to the film web and in the opposite direction to the extraction direction of the film web.

According to EP 1 616 690 A1, a stretching machine is proposed for generating a gaseous media flow via a nozzle device arranged on both sides of the film strip passed therethrough, which media flow is directed toward said film strip at an oblique angle in the opposite direction to the extraction direction of the film strip. This flow is then suctioned off by an extraction device located in front of a nozzle box in the extraction direction.

Against this background, the problem addressed by the present invention is that of providing a solution that is further improved and simplified with respect to the structure for a partitioning device for a treatment zone, in particular in the form of a treatment or stretching furnace for moving material webs, in particular in the form of a plastics film web to be stretched.

According to the invention, the problem is solved according to the features specified in claim 1. Advantageous embodiments of the invention are specified in the dependent claims.

It must be regarded as quite surprising that, within the scope of the invention, such a significantly improved partitioning effect can be achieved with respect to the individual treatment zones or treatment chambers, in particular also because extensive and lengthy tests in other directions did not come close to such a good result as is possible within the scope of the present invention.

The invention assumes that a zone or regional separation can do without mechanically operating shutters, i.e. without mechanical devices with which an attempt is made to delimit the height of an inlet or outlet gap through which a film web is moved.

According to the invention, this is achieved by generating an air curtain which, due to its specific design, is far more effective and efficient than conventional solutions.

For this purpose, the solution according to the invention includes a nozzle arrangement which runs transversely and in particular perpendicularly to the extraction direction of the flexible material web and thereby usually parallel to the flexible material web moving underneath. This nozzle arrangement comprises an air outlet opening aligned in the direction of the material web or in the form of a plurality of individual air outlet openings arranged next to one another, via which a gaseous media flow flowing in the direction of the material web can exit. However, in contrast to the solutions known from the prior art, the arrangement is such that the gaseous media flow impinges on the material web with at least one directional component transverse or perpendicular to the extraction direction of the material web. This gaseous media flow can additionally also have a component in or opposite to the extraction direction of the flexible material web. However, according to the invention, the angular alignment is important such that the gaseous media flow impinges on the material web at an oblique blowing angle, preferably at a blowing angle smaller than 85°, in the transverse direction with respect to the extraction direction and thus in particular in the perpendicular direction with respect to the extraction direction. Preferred angular ranges can lie, for example, between 30° to 60°.

The advantages according to the invention of this blowing direction of a gaseous media flow, which is positioned obliquely in the transverse direction to the extraction direction of the material web, are very diverse. One of the main advantages is that the transverse component of the correspondingly intentionally aligned media flow (jet) overlaps with the product flow direction, i.e. the flexible material web moving in the extraction direction, thereby creating an oblique outflow over the material web.

The advantage of this oblique flow over the material web lies in the spreading out of the heat transfer. When an impact jet impinges on the material web perpendicularly, an energy exchange with the material web usually takes place only very locally around a stagnation point. Further energy exchange then takes place as a result of the outflow of the impact jet of the media flow over the flexible material web. In the case of the impact jet of the fluid flow impinging perpendicularly on the material web, said outflow is directed predominantly in the direction of the axis of the machine, i.e. in and against the extraction direction of the material web. The impinging fluid can only flow off to a very limited extent transversely to said machine axis or extraction direction because the next adjacent impact jet already impinges here if a plurality of nozzle outlet openings are arranged next to one another transversely to the extraction direction (also in the case of a continuous slot-shaped nozzle outlet opening), thus blocking this flow direction.

These two parts of the heat transfer (impact jet centre and outflow of the fluid) result overall in a strip-shaped uneven heat exchange or energy exchange in the material web over the working width in the product travel direction (i.e. in the extraction direction of the material web).

The design of an "air curtain" according to the invention thus combines the advantages of a discrete fluid jet (with a very stable fluid jet for zone separation at very low production costs overall) with the homogeneous energy exchange of a planar injection. This not only achieves excellent zone separation but also a very homogeneous temperature distribution in the product in question, preferably in a flexible material web, for example in the form of a film web to be stretched, and over the entire working width of the material web.

In addition, a further advantage is that, due to the inclined impact jet, a significant reduction in the pressure load on the product in question, in particular the flexible material web, is achieved by comparison with a vertical impact jet. This in turn protects the product and thus increases the quality of the product in question.

The inclined flow also transports more fluid into the product edge region and thus also improves the heat exchange in this region, which, in the case of a plastics film web to be stretched, for example, leads to a reduced width of the edge strip with an otherwise poorer quality (which ultimately results in an increase in efficiency with regard to the product to be produced).

Finally, the further advantage resulting from the solution according to the invention should also be mentioned, according to which a certain "cleaning" effect is achieved by the obliquely exiting cross-flow of the gaseous media flow. Usually, the transport system also transports or drags fluid from a previous zone into the particular current zone, which in turn leads to e.g. cold, warm or contaminated fluid mixing, especially in the edge region of the product to be produced or processed (for example a flexible material web) and thus leads to an undefined energy exchange with the product. This cross-flow flows over the transport system and any entrained fluid is blown out.

In a preferred development of the invention, the nozzle arrangement also has at least two rows of openings, i.e. nozzle outlet openings for the exiting gaseous fluid flow, running in the longitudinal direction of the nozzle arrangement and thus transversely and in particular perpendicularly to the extraction direction of the material web. These two rows of openings are offset in the extraction direction and are preferably arranged parallel to one another. The oblique alignment of the nozzle arrangement is such that the blown-out gaseous fluid in one row of nozzles is directed transversely to the extraction direction of the material web toward one edge region of the material web, and, in the second row of nozzles offset therefrom, it is aligned in the opposite direction. As a result, a previously unknown separation and thus a shutter effect between two successive zones can be realised. This can be achieved without mechanically moving and/or adaptable shutters or size-adjustable shutter apertures.

For the sake of completeness, it must be noted that the solution according to the invention can achieve the desired advantages not only at the transition from one zone to the next zone, but also at the entry into or exit from the stretching machine and/or a stretching furnace. This is ultimately nothing more than a zone change, namely a change upon entry from the conditions outside or before the stretching machine or the stretching furnace to the conditions prevailing in the subsequent first zone. At the exit, there is ultimately also a zone change, namely from the conditions prevailing in the last zone to the conditions prevailing outside or after the stretching machine or the stretching furnace.

Finally, the solution according to the invention can itself be implemented within a zone in order to improve the blowing over the film within said zone and/or to enable a further partition and/or separation and division into zone portions for regions within a zone.

The invention will be explained in more detail hereinafter with reference to the drawings, in which, in detail.

In the following, reference is made to FIG. 1, which shows a schematic longitudinal section of a machine for treating a material web, generally a product, moving through the machine. In the present case, it is a plastics film stretching machine.

Figure 1:
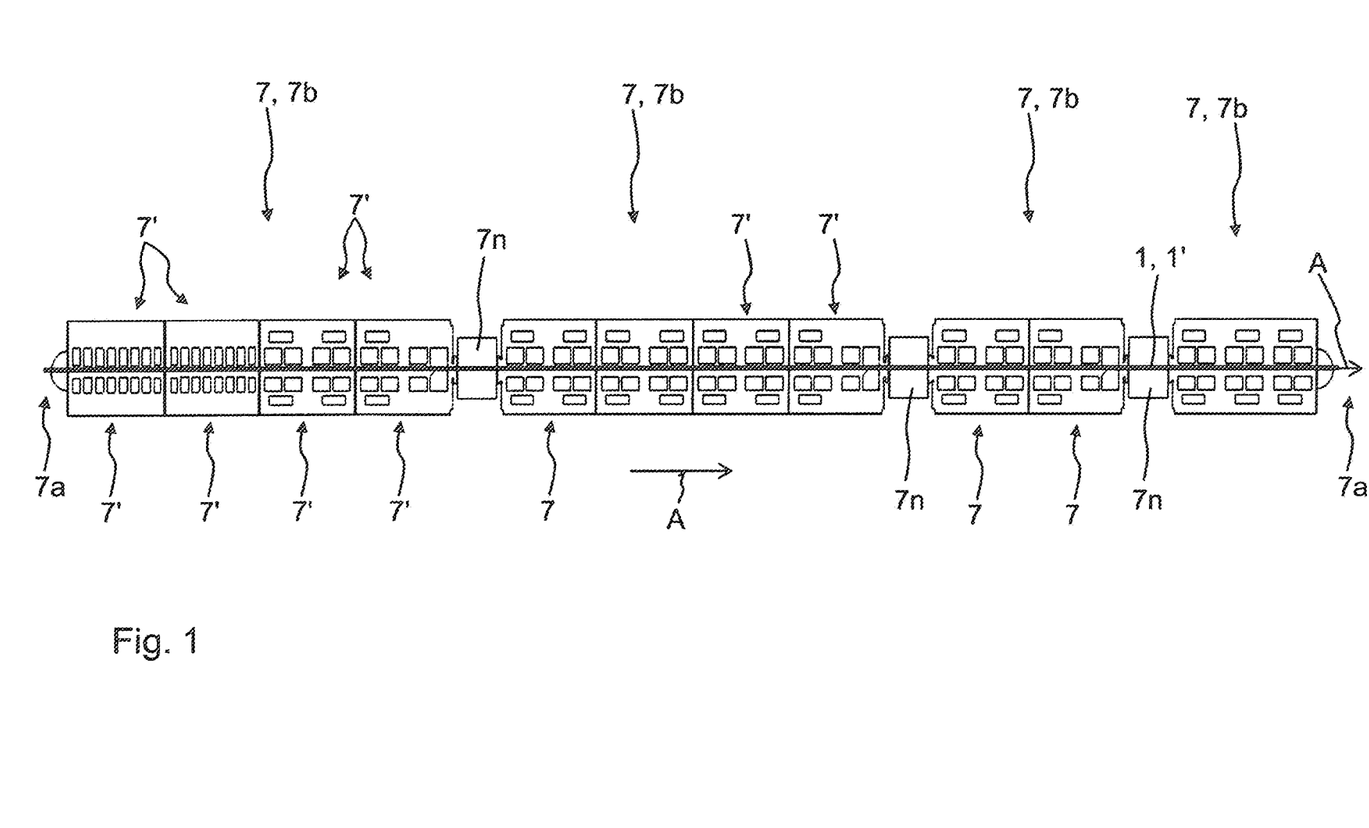
FIG. 1: is a schematic side view of a machine for treating a material web moving through the machine.

The machine 3, in particular in the form of a film stretching machine 3', shown in FIG. 1 has a stretching furnace 3", wherein a material web 1, i.e. for example a plastics film 1', is passed through the film stretching machine 3' and thus through the stretching furnace 3" in the extraction direction A. The machine 3, in particular in the form of a film stretching machine 3', may be a simultaneous stretching machine or a sequential stretching machine in which longitudinal and transverse stretching is not performed simultaneously (as in the simultaneous stretching machine), but first only in the longitudinal and then in the transverse direction, or vice versa. In principle, it can also be a transverse stretching machine.

A corresponding machine includes, for example, a corresponding housing structure 5 with a plurality of successive zones 7. In the case of a plastics film stretching machine, the zones 7 are usually treatment zones 7b which are separated from one another by a neutral zone 7n. In this case, the individual treatment zones may comprise not only one but, for example, two or generally a plurality of treatment chambers 7'. In this case, all of the zones 7 form the stretching furnace 3" which is traversed by the moving material web 1, in particular in the form of the plastics film 1'.

The structure is usually symmetrical to the plane E which is defined by the moving material web 1. However, asymmetrical structures are also possible. For the region of interest in the context of the present invention, the extraction direction A of the material web 1 runs parallel to the material web plane E which describes the position of the material web. The extraction direction A also runs parallel to the longitudinal direction AR of the machine.

The individual treatment zones 7 each have an inlet gap 9a on the zone inlet side and an outlet gap 9b on the outlet side (i.e. in general a passage gap 9), which gaps are dimensioned to be high and wide enough for the material web 1 to be moved through this slot arrangement (passage gap 9) without touching the boundary edges of the inlet and/or outlet gap or slot 9a, 9b in order to avoid damage to the material web, in particular in the form of the plastics film.

As shown schematically with reference to FIG. 1, the plastics film, which in particular is moved through the machine, can be heated to different temperatures in the individual zones. The above-mentioned neutral zones 7n can also be provided between the individual zones in order to separate two successive zones in a more pronounced manner, so that no gaseous treatment fluid can easily pass from one zone 7 into a subsequent next zone 7.

For the purpose of the invention, the space in front of the first or last zone 7 in the extraction direction also represents a zone, namely a so-called exterior zone 7a or outer zone 7a.

In order to prevent possible drag effects with the entrainment of gaseous treatment fluid from one zone into a subsequent zone that is caused by the moving material web (e.g. also from the outer zone 7a on the left in FIG. 1 into the first zone 7 or from the last zone 7 into the subsequent outer zone 7a in the extraction direction A on the right in FIG. 1), a zone or regional separation without mechanical shutters or blocking plates or similar devices is now provided according to the invention. This is achieved by optimised fluid injection which can optionally be equipped and thus supplemented with additional fluid suction.

In this respect, reference is made below to FIG. 2, in which an enlarged detailed longitudinal section through the machine 3 is shown. Two treatment zones 7, 7b can be seen, between which a neutral zone 7n is provided in the extraction direction A. For the sake of simplicity, only the upper half of the machine is shown in FIG. 2 (with a correspondingly mirror-imaged machine structure usually being provided below the material web 1).

In this case, the individual treatment zones 7b usually comprise one or more injection devices 11, offset from one another in the extraction direction A, as well as suction devices 13 which usually extend over the width of the moving material web. The suction devices 13 are in this case usually arranged further away from the material web 1 than the injection devices 11. The double arrows shown in FIG. 2 leading away from the injection devices 11 and the double arrows leading toward the suction devices 13 show the movement and flow of the fluid in the form of a gaseous media flow.

It can also be seen from FIG. 2 that a device AC for generating an air curtain is also provided, which is also referred to below as an air partitioning device AC or an air shutter AC. The gaseous fluid jets 33 and 35 exiting in two rows R1 and R2 are shown as double arrows in FIG. 2. The dashed arrows 19 indicate the arising secondary flow.

Figure 2:
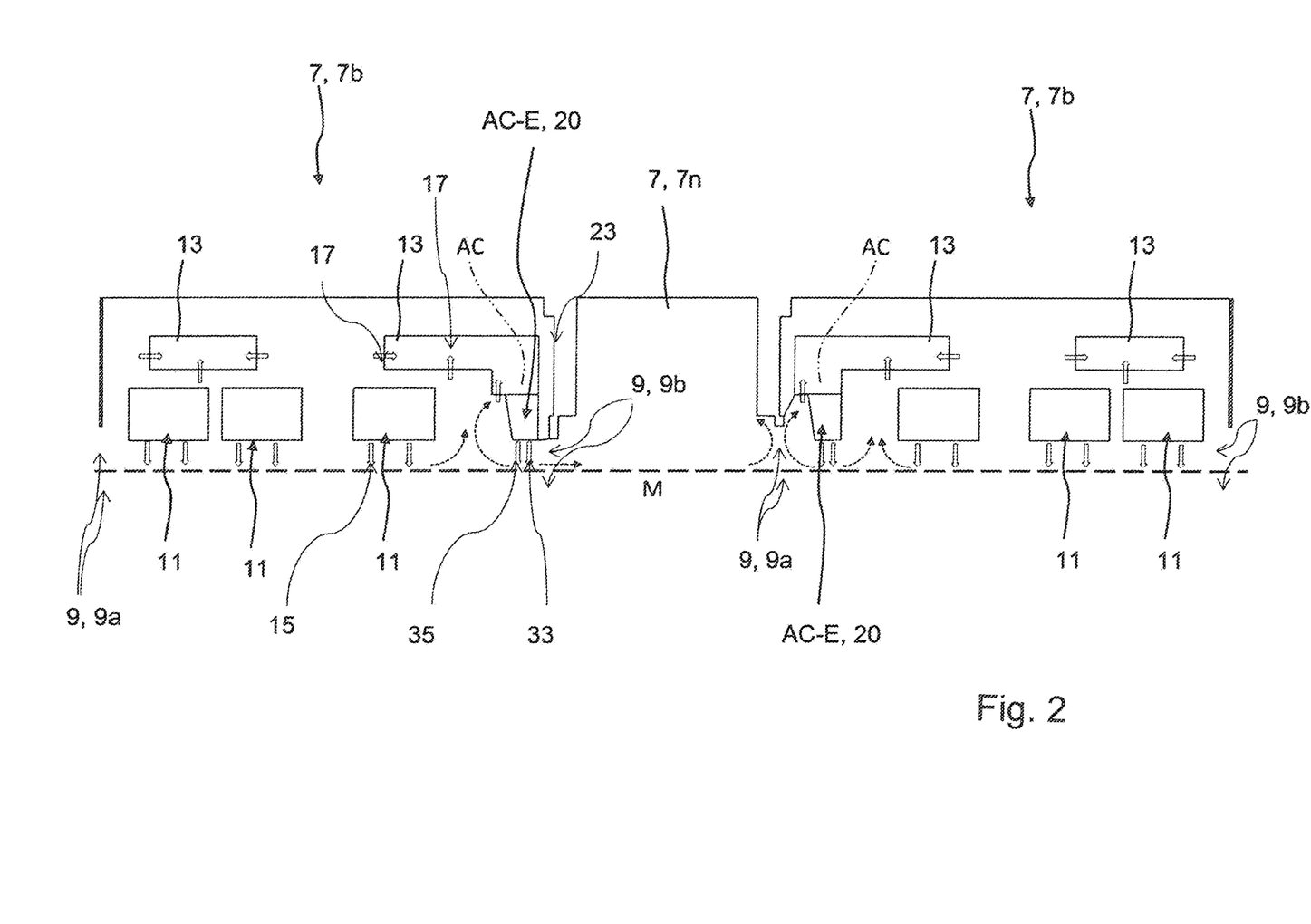
FIG. 2: is a side view of a section from the above-mentioned FIG. 1 showing two treatment zones that are spaced apart in the extraction direction of a material web, in the embodiment specifically by forming a neutral zone between the two treatment zones.

FIG. 2 also shows that such an air partitioning device AC is provided, for example, in the extraction direction A at the end of one of the treatment chambers 7b. In this case, the air partitioning device AC comprises an injection device AC-E, which can also be called an air curtain generating device AC-E, and a suction device AC-A, by means of which gaseous fluid can be suctioned off again from the treatment zone 7b.

The injection device AC-E has a nozzle arrangement D which can be designed, for example, in the form of a nozzle box 20 which extends over the entire width and substantially over the entire width or beyond in the transverse direction, preferably perpendicularly to the extraction direction A of the material web 1. It should be noted with regard to the treatment chamber 7b in question on the left in FIG. 2 that the air partitioning device AC with the associated nozzle box 20 is arranged adjacent to a zone partition wall 23 which has a passage gap 9, through which the material web 1 is passed in a contact-free manner. The zone partition wall 23 and the passage gap 9 formed therein run transversely to the extraction direction A and in particular perpendicularly to the extraction direction A and thus to the longitudinal direction AR of the machine.

The suction device AC-A with its suction opening or suction openings 27 running transversely to the material web is arranged further away from the material web 1 than the injection device AC-E with its nozzle arrangement D and the associated nozzle outlet openings 29 (which will be addressed later).

In the treatment chambers 7b downstream of the neutral zone 7n in the extraction direction A in FIG. 2, the corresponding air partitioning device AC is designed similarly, wherein the suction openings 27 of the suction devices AC-A can in this case be upstream of the nozzle device D in the extraction direction A.

Deviating from or in addition to FIG. 2, corresponding air curtains AC can also be arranged, for example on the inlet side in the treatment chamber 7 shown on the left in FIG. 2 and on the outlet side in the treatment chamber 7 shown on the right in FIG. 2. Such air curtains AC could even be provided in the outer zones 7a, i.e. for example in front of the first zone 7 in the extraction direction and the last zone 7 in the extraction direction. Finally, such air curtains AC could be arranged in the treatment chambers 7 themselves so as to be further away or more offset from the zone partition walls 23, i.e. for example in a longitudinal section between 10% to 90% based on the length of a zone 7. This region, in which an air curtain AC can be arranged, can also be between 20% to 80% or 30% to 70% or 40% to 60% of the length of a zone 7. In this respect, the treatment chambers 7' shown in FIG. 1 also represent zones 7 in accordance with the invention.

Figures 3A, 3B:
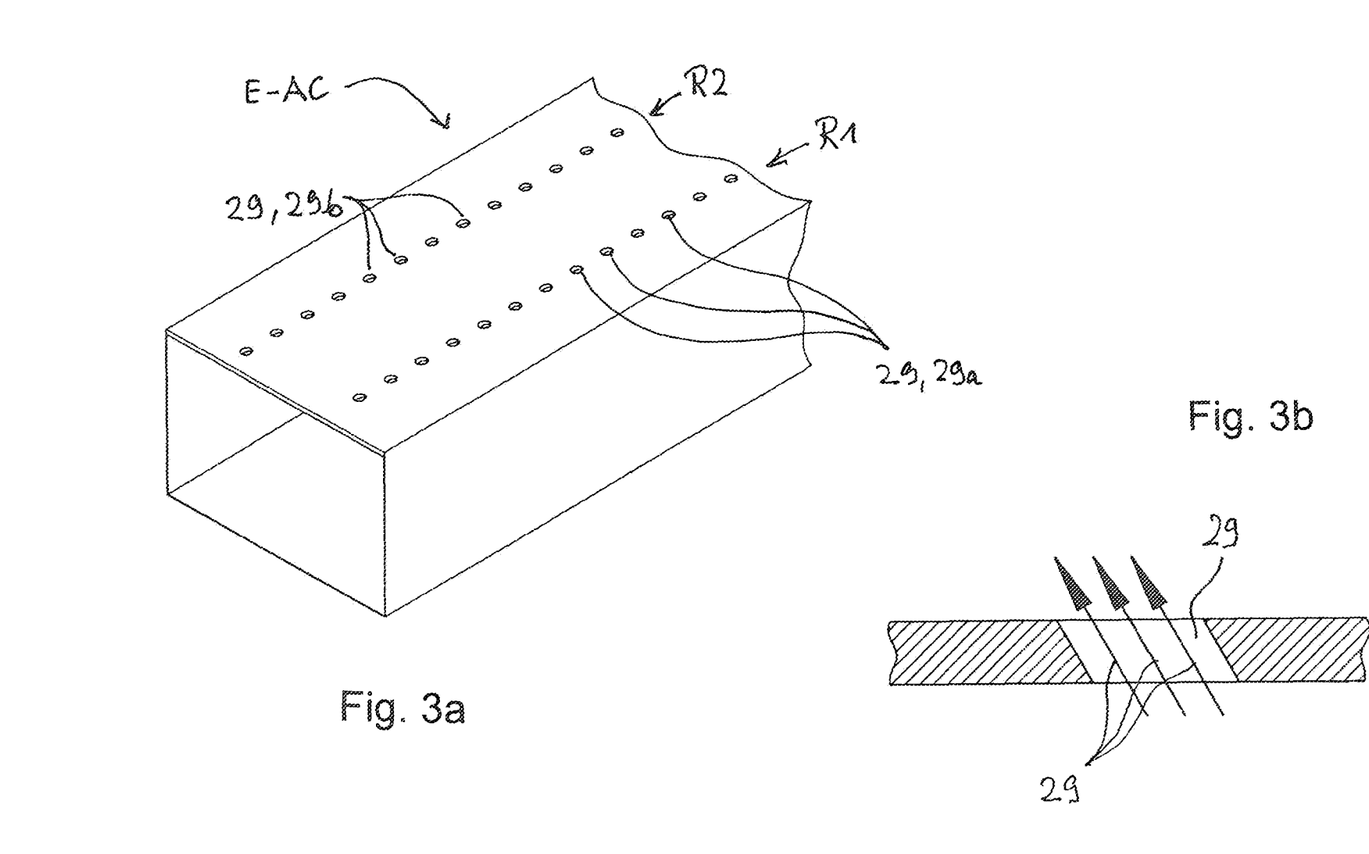
FIG. 3a: is a schematic bottom view of the injection device with the nozzle openings introduced therein, which are arranged in two rows by way of example, namely to generate two fluid flows which, with a flow component, are directed toward one side of the material web and toward the opposite second side of the material web.
FIG. 3b: is a schematic partial sectional view of the underside of the injection device, namely of a nozzle opening introduced obliquely into said underside.

FIG. 3a is a sectional bottom view of the injection device AC-E of the above-described air partitioning device AC, from which it can be seen that this injection device AC-E, preferably in the form of a corresponding nozzle box 20, comprises at least two rows R1 and R2 with nozzle openings 29.

In this case, the nozzle openings 29 can preferably consist of obliquely drilled fluid outlet openings, the significance of which will be addressed below. These obliquely drilled fluid outlet openings 29' are shown in a partial sectional view of the nozzle wall 20' of the nozzle box 20, which nozzle wall has the nozzle openings 29, in FIG. 3b.

Figure 4A:
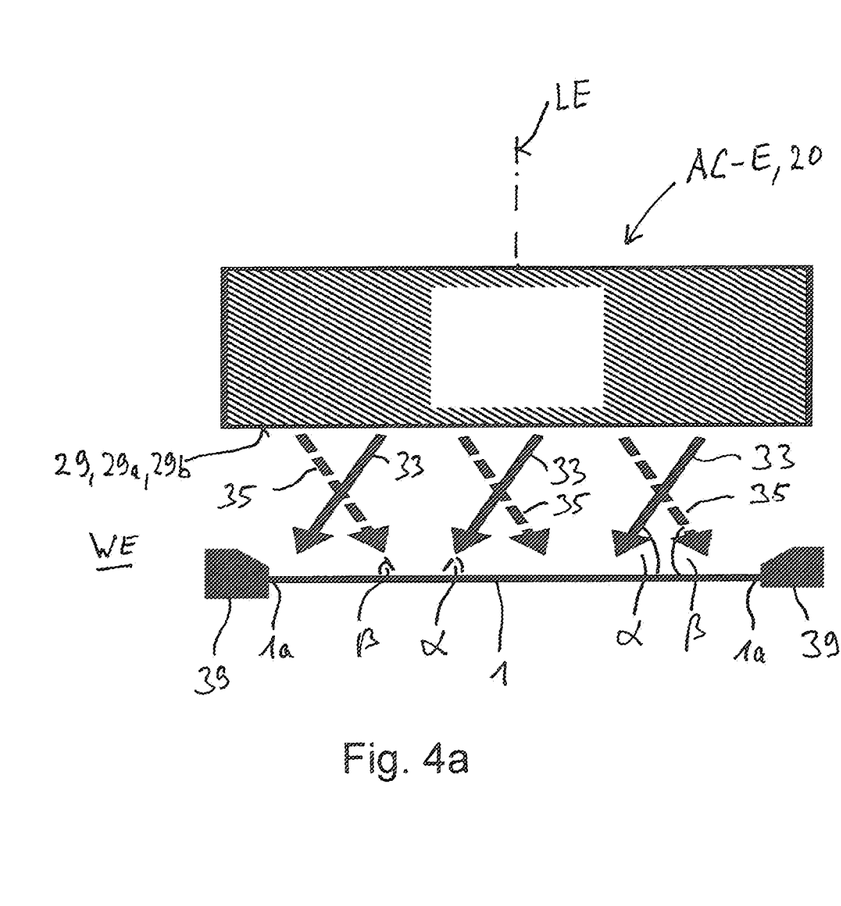
FIG. 4a: is a view, parallel to the extraction direction, of the injection device extending transversely across the material web, illustrating the flow vectors directed toward the material web, which vectors, in the embodiment shown, impinge obliquely on the material web in the transverse direction.

FIG. 4a is a schematic side view of the air partitioning device AC, i.e. in particular of the associated nozzle box 20, aligned in the extraction direction A or in the direction opposite thereto. This figure shows how the gaseous fluid flows out of the outlet openings preferably consisting of a plurality of nozzle openings 29 into the specified two rows R1 and R2.

In this case, the arrangement according to the invention is such that, for example, in the row R1 comprising the nozzle openings 29, 29a, the outlet openings are drilled, designed or aligned such that the gaseous fluid flows in the direction of the material web 1 according to the flow arrows 33. In this case, the flow direction is aligned obliquely in accordance with the flow arrows 33 at a blowing angle α with respect to the material web plane E of the material web 1. The blowing angle α lies in an angular plane WE running perpendicularly to the extraction direction A and thus perpendicularly to the flexible material web 1, which angular plane thus corresponds to the drawing plane shown in FIG. 4a or a plane parallel thereto.

The outlet openings 29, 29b which are also obliquely formed in the row R2, which usually runs parallel thereto, are now aligned in the opposite direction to the oblique position of the outlet openings 29a formed in the first row R1, so that the gaseous fluid flowing from this second row R2 flows, according to the dashed flow arrows 35 in the representation according to FIG. 4a, in the direction of the material web 1. The blowing angle also lies in an angular plane WE running perpendicularly to the extraction direction A and thus perpendicularly to the flexible material web 1, the angular opening region of which lies between the jet direction, i.e. the fluid jets 35, and the plane E of the material web 1.

The size of the blowing angle α as well as the size of the blowing angle β can be selected within wide ranges. They are preferably intended to be smaller than 85°, in particular smaller than 80°, 75°, 70°, 65°, 60°, 55°, or 45°. Conversely, the corresponding values for the blowing angle α and also for the blowing angle β are intended to be >30°, in particular >35°, 30°, 35°, 40°, 45°, 50°, 55°, 60°, 65°, 70°, 75°, or even >80°.

Figure 4B:
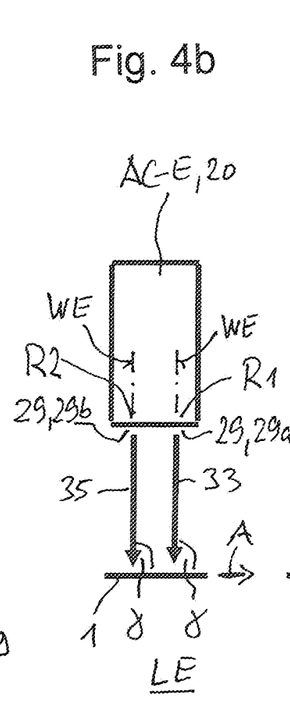
FIG. 4b: is a view rotated by 90° in relation to FIG. 4a transversely to the material web to illustrate that the flow vectors of the fluid flow exiting from the injection device, which vectors are aligned obliquely toward the material web, impinge perpendicularly on the material web in a side view, i.e. they impinge on the material web neither in the extraction direction nor in the opposite direction with an additional angular component.

FIG. 4b is a side view of the injection device AC-E in the direction of the arrow 40 in FIG. 4a. It can be seen that the nozzle openings 29, 29a, 29b are preferably aligned both in the row R1 and in the row R2 such that the out-flowing direction according to the flow conditions 33 and 35 lies in the angular plane WE which is perpendicular to the material web plane E and thus aligned perpendicularly to the flexible material web 1. In other words, the flow vectors 33 and 35 are aligned only obliquely in the angular plane WE which is perpendicular to the extraction direction A.

However, it must be noted that the angle or blowing angle α may only be an angular component lying in the aforementioned angular plane WE, namely when the corresponding flow angle has an additional oblique alignment component in the extraction direction or opposite to the extraction direction. This is also possible within the scope of the invention, it being important that the flow direction from the nozzle openings 29a, 29b in each row R1 or R2 has at least one flow component in the direction transverse and in particular perpendicular to the extraction direction A onto the material web 1.

Figure 4C:
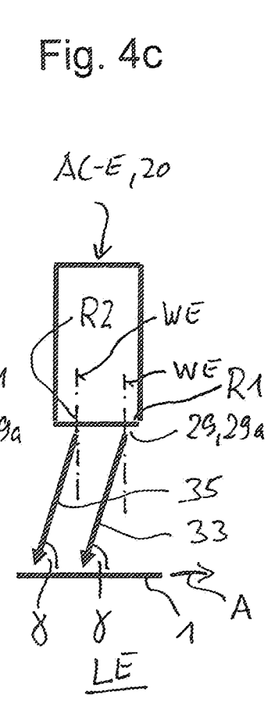
FIG. 4c: is a side view of a representation different from FIG. 4b, in which the fluid flows exiting from the injection device and oriented obliquely toward the two side edges of the material web can still impinge on the material web with an additional blowing angle component in the extraction direction or opposite to the extraction direction.

This is shown in the representation according to FIG. 4c, which differs from FIG. 4a. It can be seen that the fluid flowing from the injection device AC-E or the nozzle box 20 from the nozzle openings 29, 29a and 29b not only flows out at an oblique blowing angle α or β in the direction of the material web 1, but that this outflow direction is inclined with an additional angular component γ. This additional angular or blowing angle component γ runs in a longitudinal plane LE which is perpendicular to the material web plane E (and thus to the flexible material web 1) and not perpendicular but parallel to the extraction direction A. This longitudinal plane LE thus also runs perpendicularly to the above-described angular plane WE in which the oblique outflow, inflow or blowing angles α and β are formed. In this case, the flow vectors 33 and 35 are inclined in the representation according to FIG. 4b with an additional blowing angle component γ, wherein this inclination and thus this blowing angle component in the representation according to FIG. 4b is aligned opposite to the extraction direction A. In principle, an opposite inclination with an angle γ, i.e. a blowing angle component γ, would also be possible such that the flow vectors 33 and 35 additionally impinge on the material web 1 in the extraction direction A with the component of the angle γ.

The arrangement according to the invention with the fluid impinging obliquely in the transverse direction on the material web also produces a cleaning process as a side effect. As can be seen from the schematic representation according to FIG. 4a, the material web 1 is usually held stretched in the material web plane E on the opposite material web edges 1a via clips 39 which can be moved along a guide track. As a result, the fluid flow exiting from the nozzle openings 29a in one row R1, for example in the direction of the clips 39 provided on the left in FIG. 4a, has a corresponding flow component, whereas the fluid flow exiting from the nozzle openings 29b in the second row R2 has a flow component in the direction of the clips 39 on the opposite side and on the right in FIG. 4a. As a result, a cross-flow is achieved which contributes to the cleaning effect and additionally blows out gaseous fluid, entrained by the transport system, to the side.

It is particularly advantageous if the injection temperature of the air partitioning device AC corresponds to the temperature of the next zone or the zone in which the air partitioning device AC is positioned. With reference to FIG. 2, for example, the fluid injected via the air partitioning device AC therein has the same temperature as the fluid flows which are injected via the remaining further injection devices 11. The same applies preferably to the fluid flow which is injected on the inlet side into the treatment zone 7b on the right in FIG. 2.

In the case of strong discrete fluid or impact jets impinging on the material web 1, it could be problematic that, in the region of the stagnation point, they generate a very high local energy exchange with the product, i.e. with the flexible material web 1 in the embodiment shown. In addition, the local stagnation pressure is particularly high on thin and sensitive products such as a plastics film web.

The advantage according to the invention of the oblique overflow of the gas flow (fluid flow) in the direction of the product, herein in the form of the flexible material web 1, lies in the "spreading out" of the heat transfer. In the case of a perpendicular fluid or impact jet, the energy exchange usually takes place very locally around a stagnation point. The further exchange of energy then takes place only as a result of the outflow of the fluid or impact jet over the product, i.e. in the manner of a plate flow, for example, on the flat product in the form of a plastics film. With impact jets aligned with respect to the material web plane E of the product or the material web, this outflow occurs predominantly in the direction of the machine axis (i.e. in or against the extraction direction, generally with or against the product flow). The impinging fluid can only flow off to a very limited extent transversely to the machine axis and thus to the extraction direction A because the next impact jet already impinges here and this flow direction is thus blocked. This is shown by way of example in FIG. 5.

Figure 5:
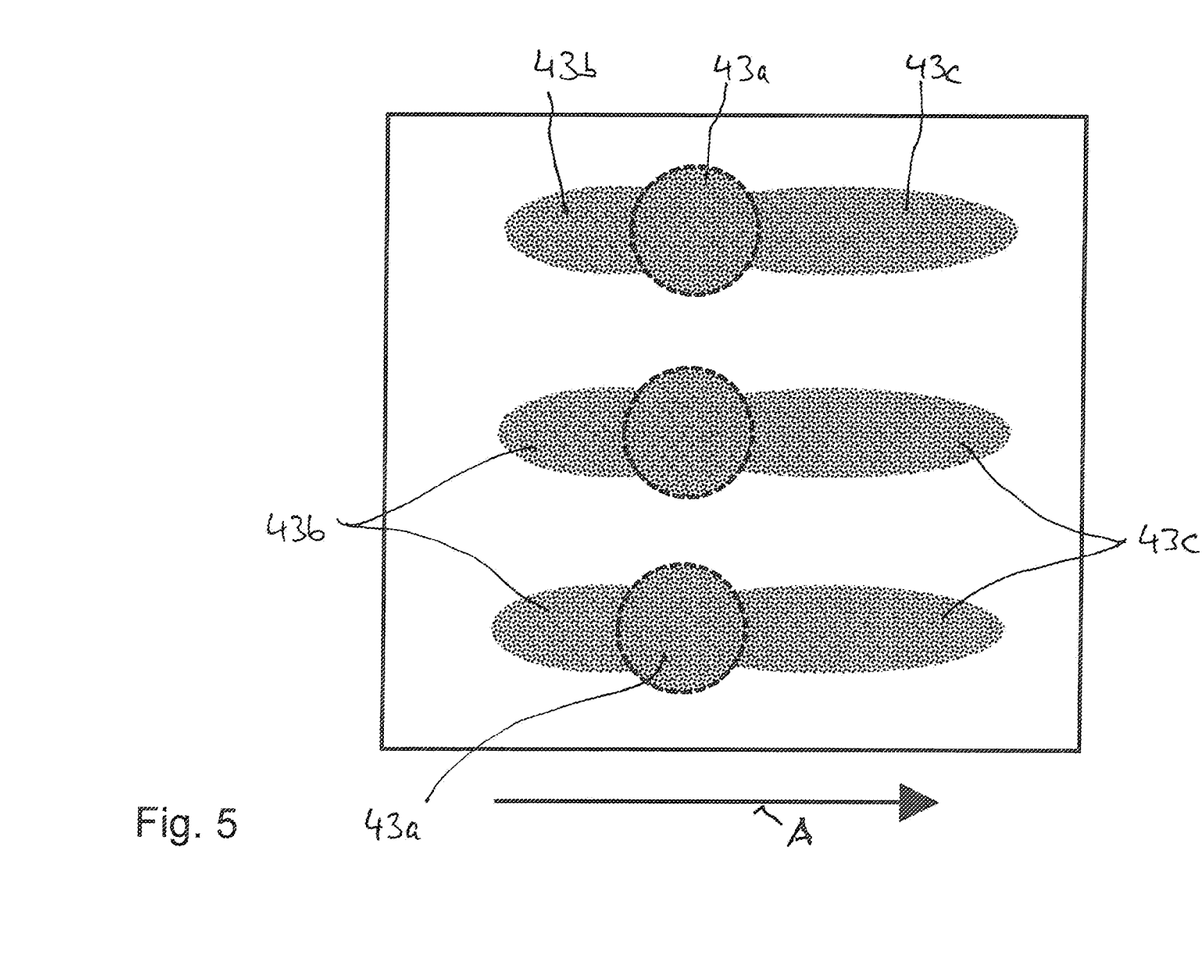
FIG. 5: shows a schematic representation of the region in a conventional machine in which the impact jet of a gaseous fluid flow impinges on the material web, i.e. by showing the regions in which a corresponding energy exchange with the heat of the impinging gaseous fluid takes place, taking into account the extraction direction of the material web.

Under conventional inflow conditions, the advancing movement of the product, i.e. the extraction speed of the plastics film, results in the spread-out heat transfer shown in FIG. 5 as a plan view of the material web 1, wherein, in this drawing, the impact or fluid flow impinging perpendicularly on the material web 1 is shown by a circular heat centre 43a, the portion of the fluid flow flowing out opposite to the product movement direction and thus opposite to the extraction direction A is shown as a heat transfer region 43b (or energy exchange region 43b) shortened by the extraction movement A, and the portion of the fluid flow flowing out in the product movement direction, i.e. in extraction direction A, is shown as a heat transfer region 43c (or energy exchange region 43c) enlarged by the product movement direction A. The shortened as well as the enlarged heat transfer region 43b and 43c thus run parallel to the extraction direction A.

Figure 6:
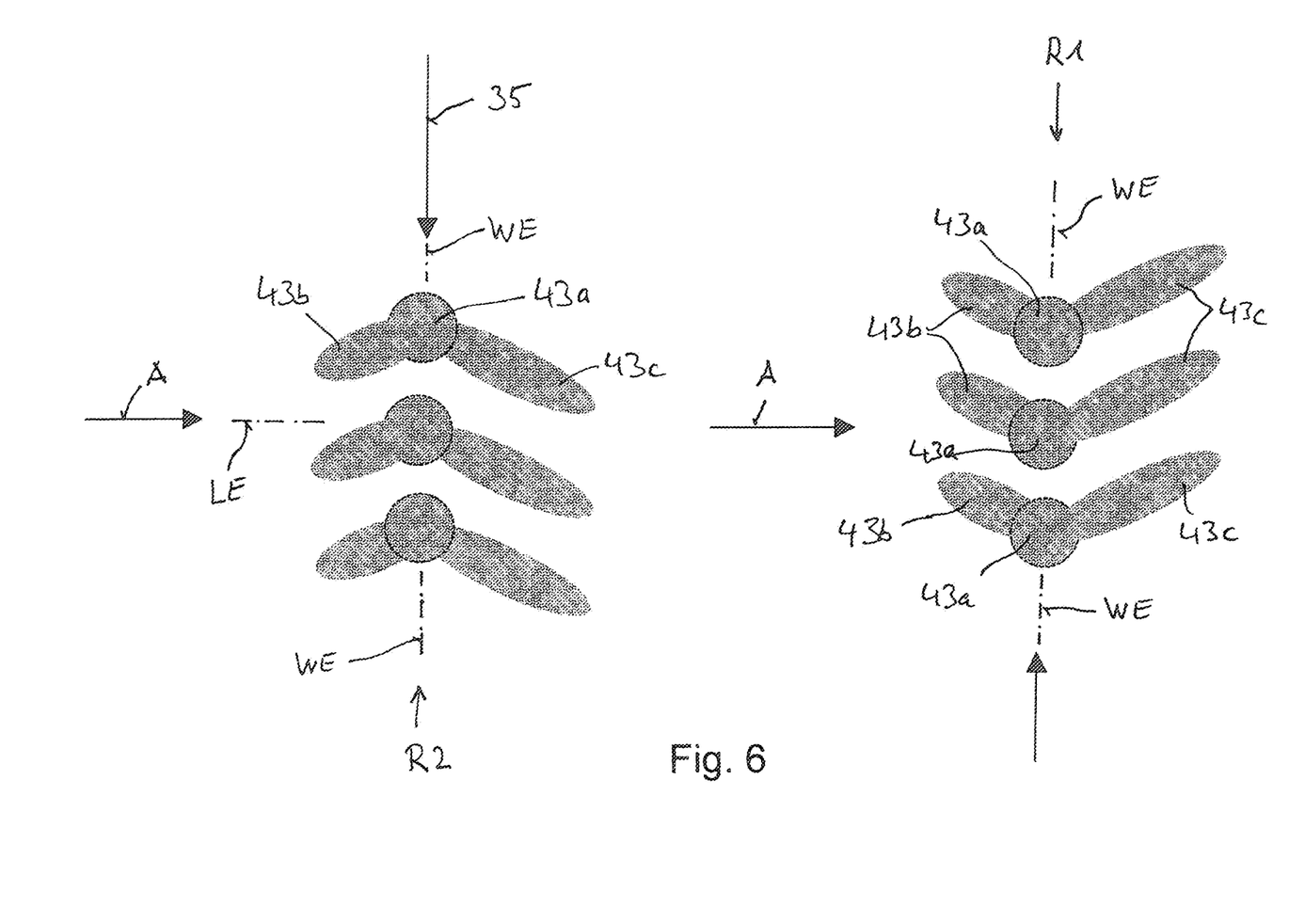
FIG. 6: shows a representation corresponding to FIG. 5 but with regard to the solution according to the invention.

In comparison, FIG. 6 shows the obliquely running heat transfer regions 43b and 43c, resulting within the scope of the invention, with respect to the heat centre 43a when the fluid flow according to the flow arrows 33 and 35 impinges on the material web plane E and thus on the material web 1 only obliquely in the transverse direction to the material web 1 and without an additional inclination angle or inclination angle component in the extraction direction or opposite to the extraction direction A as shown in FIG. 4b.

The fluid flow exiting in the opposite direction in the offset second row R2 generates corresponding heat transfer regions, specifically shortened heat transfer regions 43b and lengthened heat transfer regions 43c opposite thereto, which are aligned obliquely toward the opposite side of the material web 1.

In other words, FIG. 5 shows the region of a main energy exchange (for example in the form of heating or cooling) with the product or with the material web in the case of a classic perpendicular impact jet without any inclination in the transverse direction to the longitudinal direction and thus to the extraction direction A of the material web. The impinging impact jet or the region around the stagnation point are shown as dashed lines in the form of a circle. As mentioned above, the outflow takes place against and as a result of the drag effect of the material web 1 somewhat more intensely in the product flow direction and thus in the extraction direction A. This is indicated by the two patterned "tabs" 43b and 43c, designated as the heat transition region.

By comparison, in the solution according to the invention of FIG. 6, the region of the energy exchange in the two "tabs" is obliquely positioned because the outflow has a transverse component due to the inclined fluid jets.

This results in an opposing course of the heat transfer regions 43b and 43c in each of the two rows R1 and R2 in the extraction direction A, but said heat transfer regions are each aligned at an angle to one another in the direction of a side region of the material web. In this case, the heat transfer region 43b is shortened and the heat transfer region 43c is enlarged relative thereto, depending on the extraction movement of the material web 1 in the extraction direction A.

If the fluid were to be blown out from the injection device AC-E with an additional inclination component γ, for example opposite to the extraction direction A according to the representation in FIG. 4b, in the direction of the material web 1, the heat transfer region 43b could be enlarged and the heat transfer region 43c could be reduced depending on said blowing angle component γ. The change in size of the heat transfer regions ultimately depends both on the size of the blowing angle component γ and on the injection momentum of the fluid.

If the injection device AC-E were designed such that the fluid would be aligned at an additional angle of inclination with a blowing angle component γ in the direction of the longitudinal plane LE running in the extraction direction A, then the heat transfer regions 43c shown in the extraction direction in FIG. 6 would be further enlarged (lengthened) and the heat transfer regions 43b formed opposite to the extraction direction A would be further reduced (shortened).

The energy exchange at the impact point of the fluid jet is also reduced because the oblique alignment of the fluid flow with respect to the material web 1 means that no perpendicular impact flow can develop, and therefore the maximum and very local energy exchange is lessened. Both the reduced energy exchange in the previous maximum region (stagnation point region) and the oblique outflow of the fluid after impinging on the product lead to an energy exchange that is spread out across the working width, in particular in the transverse direction. This results in significantly more homogeneous heating or cooling, for example, of the flexible material web or generally of the corresponding product.

This air partitioning device AC with injection which is improved by comparison with the prior art thus combines the advantages of a discrete fluid jet (which is fundamentally very stable and can also be produced inexpensively in order to realise zone separation) with the homogeneous energy exchange of a more planar injection. This not only achieves excellent zone separation but also a very homogeneous temperature distribution in the product or for example the flexible material web over the entire working width of the product or the material web.

In addition, the inclined impact jet significantly reduces the pressure load on the product when compared to an impact jet impinging perpendicularly. This in turn protects the product and thus increases the quality of the product.

The drawings schematically show that the invention preferably provides two rows R1 and R2 having outlet openings 29a and 29b for two fluid flows inclined in opposite directions. However, in many cases, it can in principle also be sufficient to have a single row, the fluid jets of which are inclined in only one transverse direction with respect to the material web 1 or the product to be processed.

The nozzle outlet openings 29, 29a, 29b can be designed and shaped differently with regard to the design of the outlet openings as well as their arrangement in a plurality of hole patterns and/or rows of holes and/or hole shapes.

FIGS. 7a to 7e show examples of nozzle outlet openings of the injection device AC-E of the device AC for generating an air curtain, i.e. the so-called air partitioning device AC.

It can be seen that discrete openings or nozzle openings 29 are preferably used, for example in the form of round holes (FIG. 7a) or in the form of square holes (FIG. 7b) or generally in the form of n-polygonal openings. These designs of the nozzle openings have a very high jet stability and only lead to a slight fluctuation or swaying of the fluid jet. These stable air jets can thus be counter to the incoming drag flow caused by the movement of the product or the material web and against the incoming outflow of the adjacent nozzle box, i.e. they can stop said drag flow. The resulting conditions thus depend not only on the cross-sectional shape of the jet (for example round or square, etc.) but also on the momentum of the fluid flow introduced, i.e. the relevant impact jet.

If the momentum is too low, the fluid or impact jet may not be able to withstand the attacking flows to the desired extent, so that it may be at least partially deflected or suctioned off directly.

The introduced and necessary momentum of the fluid flow depends in this case on the material web speed and the further attacking flow forces which are caused, for example, by the adjacent jets, vortex systems or pressure differences in the vicinity of the air partitioning device AC. In a first order of magnitude, 2 to 8 times the material speed, i.e. the extraction speed of the product/material web, can be used as the basis for the injection speed. If the speed and thus the momentum is too low, the desired partitioning may not be produced or not be produced to a sufficient extent.

As shown schematically with reference to FIG. 2, the drag flow and the outflow of the fluid or impact jet collide, so that the fluid can only escape upwards. The fluid is then suctioned off in the resulting vortex system by the suction devices or absorber boxes 13.

As already mentioned, FIGS. 7*a* to 7*e* show different variants in a bottom view of the nozzle box which extends in the longitudinal direction L according to the arrow (i.e. transversely and preferably perpendicularly to the extraction direction A of the material web and thus parallel to the material web plane E of the material web), wherein only a comparatively short portion of the bottom view of this longitudinal extension is shown schematically.

The exhaust opening arrangement or device 57 is generally designed such that the openings are arranged in a region on the underside 11, which region is somewhat narrower and more central than the width of the underside 51 itself.

Figures 7A, 7B:
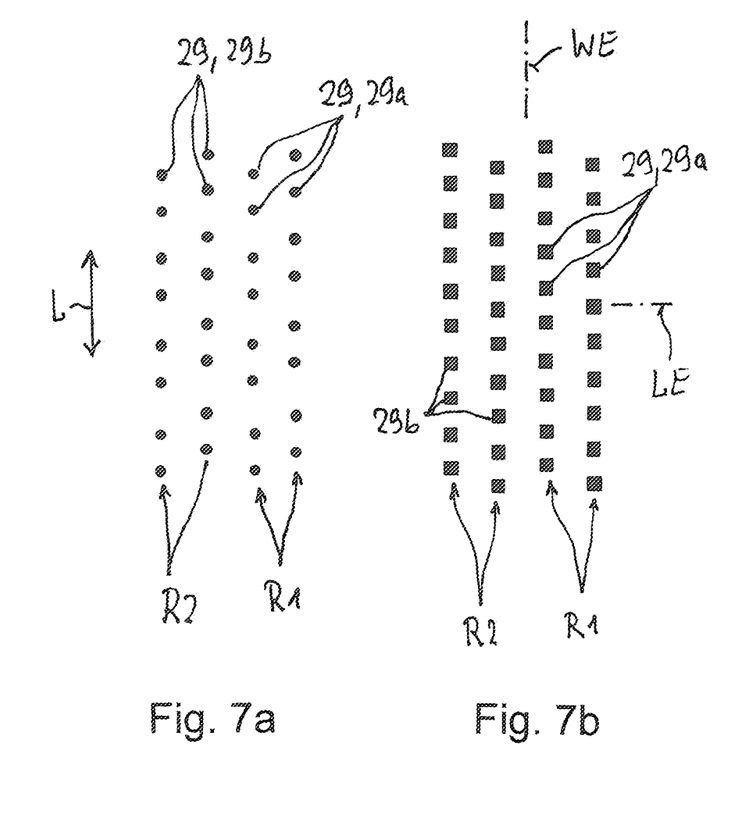
FIGS. 7a to 7e: show different representations for outlet openings for the fluid in the injection device.

In the variant according to FIG. 7*a*, for example, a plurality of successive round holes 29 running in the longitudinal direction L of the nozzle box 20 is provided. It can be seen that each of the two rows of holes R1 and R2 consists, for example, of a double row of holes, i.e. these hole arrangements of the nozzle openings 29 do not have to consist of a single or singular row of holes in each row R1 and R2. Likewise, the individual rows can also comprise triple or generally n times the rows of holes arranged next to one another. If a plurality of rows of holes is provided next to one another, it does not necessarily mean that the injection angle for the two or more rows of holes is identical. For example, it is also possible for two or more rows of holes running laterally next to one another to have different and/or even opposingly aligned injection angles. In other words, two successive rows of holes can have alternately aligned injection angles and/or even have different injection angles in the individual rows of holes themselves.

FIG. 7*b* shows a representation corresponding to FIG. 7*a* but which uses square holes or air outlet openings 29.

Figure 7C:
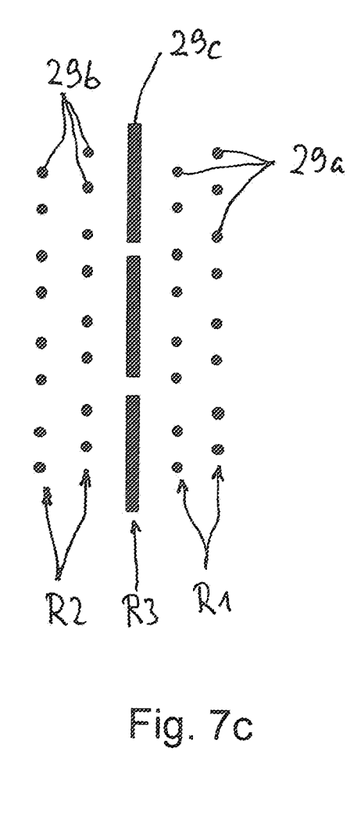

The representation according to FIG. 7*c* shows that, between the two nozzle openings that emit in an inclined manner in the opposite lateral direction according to the rows R1 and R2, a neutral central row R3 with nozzle openings 29*c* is provided, from which, for example, a fluid flow can exit exactly perpendicularly in the direction of the material web plane E and thus perpendicularly to the material web 1, i.e. at one of the above-described oblique angles α, β and/or γ.

Figure 7D:
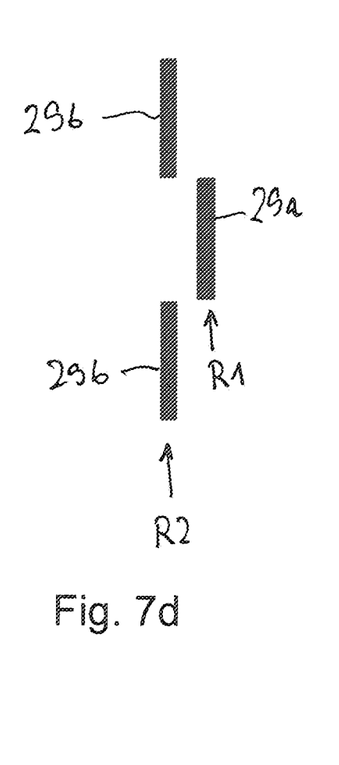

In the representation according to FIG. 7*d*, it is indicated that outlet openings 29, i.e. 29*a* or 29*b*, respectively, are arranged in two rows R1 and R2 adjacent to one another, which rows, however, always only extend over a portion in the transverse direction or in the perpendicular direction to the extraction direction A of the material web. These outlet openings are in this case all shown as rectangular outlet openings. In the interior, however, they comprise guide arrangements such that the fluid flows exiting from these rectangular openings exit in row R1 for example at the blowing angle α, and in row R2 at a blowing angle β inclined relative to the material web, wherein the blowing angle component γ can be formed in or opposite to the extraction direction at 90° or, as described, can also be formed with an oblique inclination component of less than 90°.

Figure 7E:
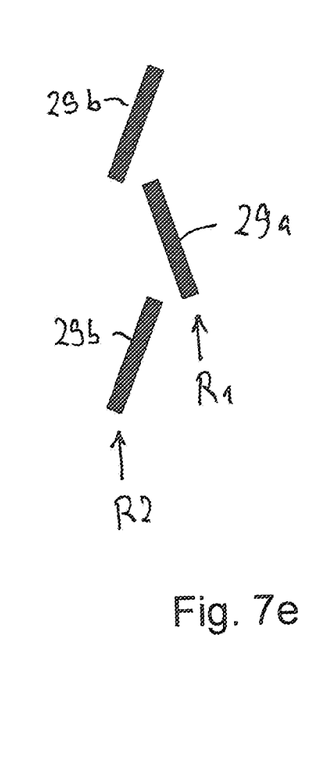

In the variant according to FIG. 7*e*, it is shown that the two rows can have rectangular outlet openings which are even designed to be slightly oblique and not necessarily perpendicular to the extraction direction. In each of these elongate outlet openings 29*a* and 29*b*, however, the fluid flow emerges as described with a corresponding direction of inclination in the angular plane WE and possibly with an additional angular component in or opposite to the extraction direction.

In general, it must be noted that the hole geometry for the exhaust openings is actually not subject to any restrictions and can have any geometry and can even consist of combinations of the variants shown only by way of example. For example, in addition to round or angular outflow openings or nozzle openings, other geometric shapes of the opening can also be used in the described injection device AC-E, as partly described and shown in the form of one or more slots, round holes, moulded openings such as elongated holes or oval holes, parallel or offset or positioned elongated holes or also in the form of combinations of these variants.

The exhaust opening arrangement can thus, as mentioned, comprise holes and/or slots and/or generally fields of holes which, over the length of the nozzle box and/or at least over the width of the material web, have either a constant or evenly repeating geometry and/or shape and/or size with regard to the nozzle outlet openings. However, it is also possible that a constant geometry is not provided over the length of the nozzle box. For example, the exhaust opening arrangement can have holes, slots or other through-openings which change in shape and in diameter and/or size over the length of the nozzle box or at least in portions over the length of the nozzle box. There are no fundamental restrictions in this respect either.

It must also be noted that the exhaust nozzle arrangement of the nozzle openings 29, 29*a* or 29*b* can be selected according to the length and/or width of the nozzle box 20. Ideally, the exhaust nozzle arrangement is provided to extend in the nozzle box 20 at least at such a length (and therefore transversely or perpendicularly to the extraction direction of the material web) that it corresponds to the width of the material web. This allows a media flow to be generated over the entire width of the material web.

The invention claimed is:

1. A treatment machine for flexible material webs which can be passed through treatment furnaces, comprising:
    the treatment machine comprises at least two successive zones in an extraction direction of the material web, having a zone separation device,
    in relation to the extraction direction (A) of the flexible material web, the zone separation device comprises at least one air partitioning device (AC) having an injection device (AC-E) which extends transversely to the material web and is designed such that a gaseous fluid flow (S) extending up to the flexible material web is generated above it,
    wherein the injection device (AC-E) is also designed such that the gaseous fluid flow from the injection device (AC-E) impinges in transverse direction obliquely onto the flexible material web and thus on the material web plane (E) formed by the material web at a blowing angle (α) formed with respect to the flexible material web or with a blowing angle component (α) formed with respect to the flexible material web of less than 80°, wherein the blowing angle (α) or the blowing angle component (α) lies in an angular plane (WE) running perpendicularly to the extraction direction (A) and thus perpendicularly to the flexible material web.

2. The treatment machine according to claim 1, wherein the injection device (AC-E) has nozzle openings which are aligned in the direction of the material web and arranged in at least one row (R1, R2) extending transversely or perpendicularly across the material web.

3. The treatment machine according to claim 1, wherein a fluid flow exits from the injection device (AC-E), which fluid flow is aligned partly at a blowing angle (α) or blowing angle component (α) running obliquely on one side of the material web and partly at a blowing angle (β) or blowing angle component (β) running obliquely in the opposite direction on the opposite side of the material web.

4. The treatment machine according to claim 1, wherein the injection device (AC-E) has nozzle openings which are aligned in the direction of the material web and arranged in at least two rows (R1, R2) extending transversely or perpendicularly onto the material web, wherein the fluid flow exiting from the nozzle openings of one row (R1) along the flow arrows (33) impinges on the material web at an oblique angle (α) or blowing angle component (α), and in that the fluid flow exiting from the nozzle openings of the at least one further row (R2) along the flow arrows impinges on the material web at an oblique angle (β) or blowing angle component (β) inclined opposite thereto.

5. The treatment machine according to claim 1, wherein the injection device (AC-E) is designed such that the fluid flow exiting therefrom is inclined at a blowing angle (α, β, γ) in relation to the material web plane (E) and thus in relation to the material web such that
   a) the blowing angle (α; γ) lies only in the angular plane (WE) aligned perpendicularly to the extraction direction (A) and thus to the material web plane (E) and its blowing angle component in the extraction direction (A) or opposite to the extraction direction (A) is 90°, or
   b) the blowing angle (α; γ) additionally has a blowing angle component (γ) in the extraction direction (A) or opposite to the extraction direction (A), which component has a value less than or equal to 85° with respect to the material web plane (E).

6. The treatment machine according to claim 1, wherein a suction device (AC-A) is provided adjacent to the injection device (AC-E), which suction device is arranged parallel and/or with respect to the material web plane (E) such that its suction openings are further away from the material web plane (E) than the nozzle openings in the injection device (AC-E), and in that the suction device (AC-A) is upstream or down-stream of the injection device (AC-E) in the extraction direction (A) of the material web.

7. The treatment machine according to claim 1, wherein the fluid flow exiting via the injection device (AC-E) has an injection temperature which corresponds to or deviates from the temperature in a subsequent treatment zone in the extraction direction (A) or the treatment zone in which the injection device (AC-E) is positioned by less than 20° C. or by less than 15°, 10°, 5°, 2° or by less than 1° C.

8. The treatment machine according to claim 1, wherein the blowing angle (α, β) lying in the angular plane (WE) or the blowing angle component (α, β) lying in the angular plane (WE) is
   a) less than 75°, 70°, 65°, 60°, 55° or less than 45° and/or
   b) greater than 30°, 35°, 30°, 35°, 40°, 45°, 50°, 55°, 60°, 65°, 70°, 75°.

9. The treatment machine according to claim 1, wherein the blowing angle component (γ) lying in a longitudinal plane (LE) perpendicularly to the angular plane (WE) and thus parallel to the ex-traction direction (A) is
   a) less than 85°, 75°, 70°, 65°, 60°, 55° or less than 45° and/or
   b) greater than 30°, 35°, 30°, 35°, 40°, 45°, 50°, 55°, 60°, 65°, 70°, 75°.

10. The treatment machine according to claim 1, wherein the injection device (AC-E) has or comprises nozzle openings which consist of round, circular, square, oval, rectangular and/or n-polygonal openings or a combination of the aforementioned openings.

11. The treatment machine according to claim 1, wherein the fluid flow emerging from the injection device (AC-E) and impinging on the material web plane (E) at an oblique blowing angle (α; β; γ) is generated by nozzle openings which are formed
    a) by bores or channels running obliquely in an out-let wall of the injection device (AC-E) and/or
    b) by corresponding flow guide devices generating an oblique fluid flow.

12. The treatment machine according to claim 1, wherein the injection device (AC-E) is designed such that a fluid flow is discharged thereby in the direction of the material web at an exhaust speed
    a) that corresponds at least to an extraction speed of the material web in the extraction direction (A) or at least to 2, 3, 4, 5, 6, 7, 8 or at least 9 times the extraction speed of the material web, and/or
    b) that corresponds at most to 10 times the extraction speed of the material web in extraction direction (A) or at most to 9, 8, 7, 6, 5, 4, 3 or at least 2 times the extraction speed of the material web.

13. The treatment machine according to claim 1, wherein:
    between the at least two successive zones, the zone separation device for separating the successive zones comprises a zone partition wall running transversely or perpendicularly to the extraction direction (A) of the flexible material web,
    a passage gap is provided in the zone partition wall, through which gap the flexible material web can be moved in a contact-free manner in the extraction direction (A),
    in relation to the extraction direction (A) of the flexible material web, the air partitioning device (AC) with the blowing device (AC-E) extending transversely to the material web is upstream and/or downstream of the zone partition wall immediately adjacent thereto.

14. The treatment machine according to claim 1, wherein the air partitioning device (AC) is arranged within a zone away from or not adjacent to a zone partition wall on the inlet and/or outlet side.

* * * * *